United States Patent
Dray

[11] Patent Number: 5,151,282
[45] Date of Patent: Sep. 29, 1992

[54] POSITIVE-TYPE NON-RETURN VALVE

[76] Inventor: Robert F. Dray, Rte. No. 1, Box 281 D, Hamilton, Tex. 76531

[21] Appl. No.: 699,277

[22] Filed: May 13, 1991

[51] Int. Cl.⁵ .............................................. B29C 45/23
[52] U.S. Cl. .................................... 425/562; 425/563; 425/564
[58] Field of Search ................ 425/559, 562, 563, 564

[56] References Cited

U.S. PATENT DOCUMENTS

| | | | |
|---|---|---|---|
| 3,438,393 | 4/1969 | Godley, II | 137/533.17 |
| 3,590,439 | 7/1971 | Swanson | 137/533.17 |
| 4,062,479 | 12/1977 | Szabo | 425/564 |
| 4,105,147 | 8/1978 | Stubbe | 425/562 |
| 4,512,733 | 4/1985 | Eichlseder et al. | 425/563 |
| 4,643,665 | 2/1987 | Zieger | 425/564 |
| 4,758,389 | 7/1988 | Lampl | 264/40.1 |

FOREIGN PATENT DOCUMENTS

| | | |
|---|---|---|
| 0199823 | 5/1986 | European Pat. Off. |
| 0228799 | 7/1987 | European Pat. Off. |
| 0326031 | 1/1989 | European Pat. Off. |
| 2719497 | 11/1978 | Fed. Rep. of Germany ...... 425/562 |
| 1372631 | 11/1974 | United Kingdom . |
| 1413527 | 11/1975 | United Kingdom . |
| 1449728 | 4/1976 | United Kingdom . |
| 1462645 | 1/1977 | United Kingdom . |
| 2019608 | 10/1979 | United Kingdom . |
| 2105064 | 3/1983 | United Kingdom . |

Primary Examiner—Tim Heitbrink
Attorney, Agent, or Firm—Hubbard, Thurman, Tucker & Harris

[57] ABSTRACT

A positive-type, non-return valve (10) primarily for use with an injection molding machine utilizes a frame (12) which surrounds a coaxial primary chamber (34). The primary chamber (34) is accessed by several passages. Inlets (30) allow material to be fed to a reduced diameter passage (34) adjacent to said primary chamber (32). Outlet passage (42) connects this reduced diameter passage (34) to outlet ports (40). A piston (60) is dimensioned to fit within said primary chamber (32) and reduced diameter passage (34). In a forward position, the piston (60) allows positive flow of material therethrough. In a rearward position, the piston (60) positively blocks flow of material from the inlet (30) to the outlet passage (42). The piston (60) is forced to its rearward position during the injection step.

21 Claims, 2 Drawing Sheets

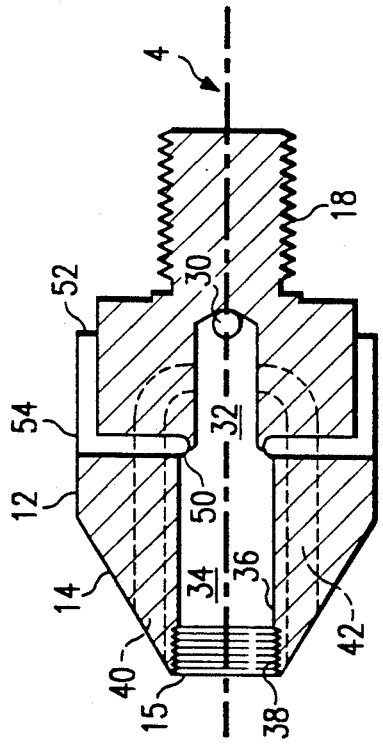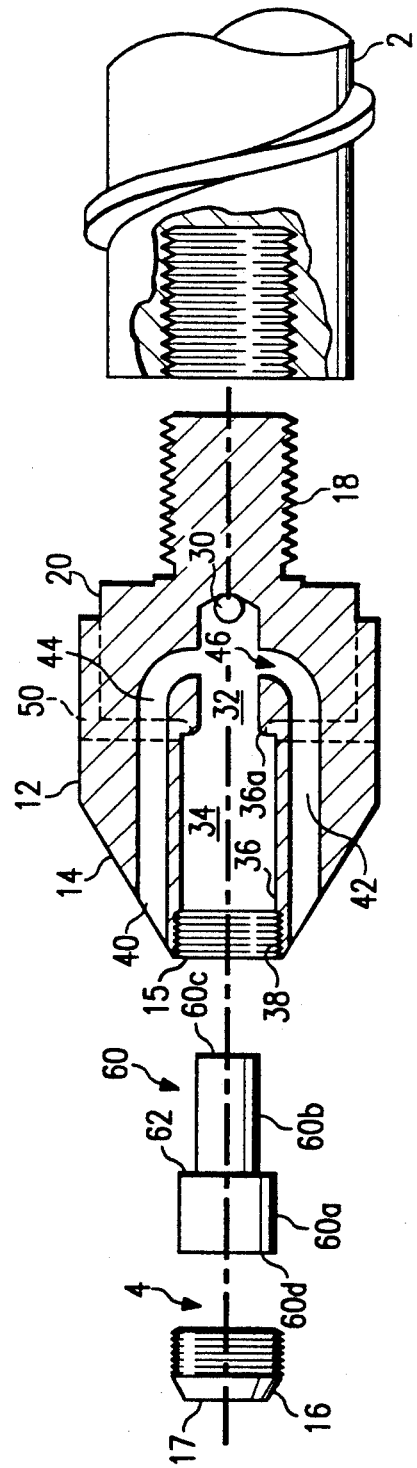

POSITIVE-TYPE NON-RETURN VALVE

TECHNICAL FIELD OF THE INVENTION

The present invention relates to a positive-type non-return valve. In particular, the valve is used to positively stop the reverse flow of material therethrough.

BACKGROUND OF THE INVENTION

Injection molding is one of the dominant forms of manufacturing in the world today. However, a problem with uniformity of product plagues this process of injecting a volume, or shot, of melted plastic into a mold. Uniformity is sacrificed due to the inability to perfectly control the volume of material injected into the mold. This imperfection is due primarily to failure of a non-return valve, found on all injection molding machines, to properly seal against back flow of material during the injection step.

A review of the prior art illustrates two primary methods of sealing against this back flow of material during the injection step: a ring-type shut off valve or a ball-type check valve. With either method, as the injection ram strokes forward, a ball is forced into a hole that it cannot go through or a tapered ring abuts against another ring with a complementary taper. There are various alterations on these devices that either control the length of the stroke or size of the inlet.

A non-return valve is disclosed in U.S. Pat. No. 4,105,147 to Stubbe. In Stubbe, the outer cylindrical periphery of the moveable valve has axially extending circumferentially spaced grooves. On the forward stroke of the feed screw, the grooves are moved out of alignment with the grooves in a fixed part when the screw is moved forward by the piston on the cylinder. The pressure of the plastic in the cavity forces the moveable valve part forward of the fixed valve part. The projection moves into the radial groove, thus turning the moveable valve part and moving the grooves out of alignment with the valve grooves. A surface on the moveable valve part seats on a surface of the fixed valve part stopping the flow of plastic material. In sum, on the filling end of the valve, when the screw starts its rotation and pressure is developed the ring is pushed in the downstream direction rather than upstream by the injection force. When it is forced downstream, the area downstream from the shut off device is filled at some set pressure, for example, 500 psi, that forces the screw backwards to its position to begin the next cycle. The next cycle begins on the forward stroke of the hydraulic system moving the screw forward again closing the ring, forcing the material trapped downstream into the injection mold.

The sealing surfaces in either a ring-type or ball-type valve can become contaminated with particles which prevent a perfect seal. This allows for material migration back through the valve rather than forward into the mold. This lost volume of material will cause an imperfect product from the mold. To detect these imperfect products requires significant inspection costs or inconvenience for the ultimate user of the product. To improve quality, many manufacturers have implemented statistical process control (SPC) which requires that all supplied product be identical, eliminating the need for inspection. Therefore, a need exists for a non-return valve which never fails to furnish the same shot size regardless of wear or contamination. This valve should be designed to allow its incorporation into existing injection molding machines or any other device which utilizes a non-return valve. Furthermore, this valve should be designed so that the seal can never be impaired by particles. Thus, each time the valve seals, the sealing action should shear and clear away any such particles.

SUMMARY OF THE INVENTION

The present invention relates to a positive-type non-return valve. The valve is designed for use in an injection molding device but may be used in any application requiring one-way flow of a liquid material. The valve is comprised of a frame surrounding a primary chamber. The frame is generally cylindrical with a tapered, conical distal end. The proximal end can be threaded to allow for connection to a screw ram or feed screw located in a barrel; however, the valve could also be an integral part of the feed screw. The outer diameter of the valve must closely approximate the inner diameter of this barrel. The primary chamber extends to an axially-centered opening in the distal end. Because material is flowing through the valve, its proximal end is also referred to as upstream and its distal end is also referred to as downstream.

The primary chamber is accessed by several passages. The first passages to the primary chamber are a pair of inlet ports. These ports lead to a reduced diameter passage upstream of and connected to the primary chamber. A second pair of outlet passages lead from this reduced diameter passage to the distal end of said valve. The outlet passages leads to a pair of ports located on the tapered surface portion of the valve. The outlet passage is typically first perpendicular to the reduced diameter passage and then parallel to the central exit. The outlet passage is also distally located from the inlet in said reduced diameter passage.

A piston is dimensioned to fit inside the primary chamber and extend into the reduced diameter passage. The piston has a main body, and a reduced diameter body which fits in the reduced diameter passage. The travel of the piston is limited by a flow-through cap removably attached to the distal end of the valve and by the ridge formed when the diameter of the primary chamber reduces. The reduced diameter portion of the piston is dimensioned to block the opening to the outlet passage when said piston is in a rearward position, and to uncover said opening when in a forward position.

Material, typically melted plastic, is fed into the inlets by the feed screw. This material floods the reduced diameter chamber or passage and forces the piston to its forward position against the cap. The material then proceeds into the outlet passages, out of the valve and into an accumulation area. When this area is full, the feed screw stops rotating and rams forward in the barrel. Pressure is created in the accumulation area which tends to push material back into the outlet passages and out the inlet. However, the pressure also pushes the piston to its rearward position which blocks the flow of material from the outlet to the inlet.

The piston, during this movement, will encounter pressure against its reduced diameter proximal surface equal to the pressure against its distal face. However, the force against its distal face is greater and will overcome the force on its proximal face due to the differences in their respective surface areas. The piston will also deter clogging because it will tend to shear away any contaminants in its way.

Due to the close fit of the piston within the primary chamber and reduced diameter passage, a vent or pressure relief passage is also required. This vent connects a portion of the primary chamber immediately adjacent to its transition to the reduced diameter passage with the feed path of the screw. Thus, when the screw rotates, material is forced into both inlet passages and into the vent. As the piston is moved forward by pressure from the inlet passages, material also enters the primary chamber upstream of the piston. When the piston is forced to its rearward position, this material is forced back out of the vent and back to the feed path of the screw.

BRIEF DESCRIPTION OF THE DRAWINGS

For a more complete understanding of the present invention, and for further details and advantages thereof, reference is now made to the following Detailed Description taken in conjunction with the accompanying drawings, in which:

FIG. 4 is a longitudinal sectional view across line 4—4 in FIG. 2; and

FIG. 5 is a longitudinal sectional view across line 5—5 in FIG. 2.

DETAILED DESCRIPTION

Figure 1:
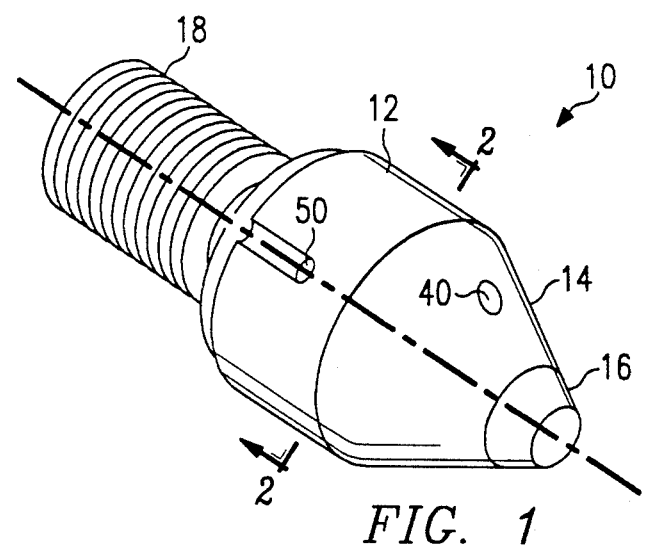
FIG. 1 is an isometric view of the positive-type, non-return valve.

The present invention relates to a positive-type non-return valve that overcomes many of the disadvantages found in the prior art. Referring to FIG. 1, a positive-type non-return valve embodying the present invention is disclosed. Valve 10 is typically made of steel and used as part of an injection molding machine unit having a barrel, with an injection nozzle on one end of the barrel and a screw ram movable in the barrel. The valve 10 allows material to pass therethrough when the screw ram is rotating but closes when the ram moves forward. All dimensions provided are for a valve 10 attached to a two and one-half (2½) inch feed screw. Other dimensions may be used to suit the situation.

Figure 3:
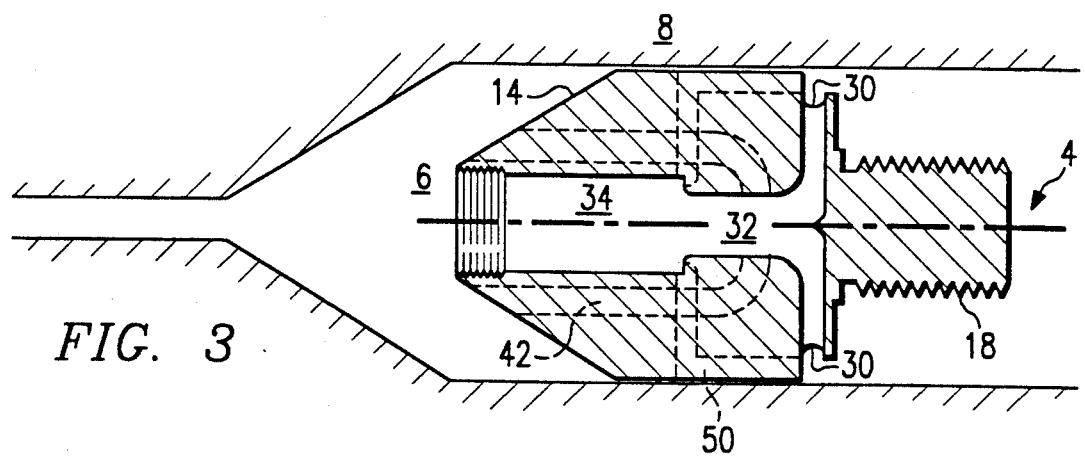
FIG. 3 is a longitudinal sectional view across line 3—3 in FIG. 2.

Referring to FIGS. 1 and 5 simultaneously, valve 10 comprises a generally cylindrical frame 12 with an inclined outer surface 14 of constantly reducing diameter on the distal end and an attachment surface 18 on the proximal end. A cap 16 or other retaining means with a flow through central passage 17 is attached to frame 12 typically by annular male threads. A piston 60 is located in primary chamber 34 of frame 12. The non-return valve 10 is attached to or a part of feed screw 2, shown in FIG. 5, both of which are located in a barrel 8, shown in FIG. 3, with an accumulation area 6, shown in FIG. 3, located downstream of said valve 10. The screw 2 and valve 10 fit slidably within said barrel so that only a minimal amount of material can be forced back around the periphery of said valve 10. Instead, material is fed by the rotating screw 2 into inlets 30. As discussed, frame 12 contains a centrally located primary chamber 34 or second bore which is accessed by several channels. Inlets 30, located on ridge 20 lead to a reduced diameter passage 32 or first bore, best seen in FIG. 3, which is at a right angle to inlets 30. Inlets 30 are oppositely located on ridge 20 and radially extend to the axis 4 of frame 12. The inlets are preferably one quarter (¼) inch in diameter. The reduced diameter chamber 32 is coaxially located within the frame 12 and extends from the inlets 30 to the primary chamber 34. The reduced diameter chamber 32 is preferably one inch long and approximately one half (½) inch in diameter.

The primary chamber 34 is coaxially located in the frame 12 immediately downstream of the reduced diameter passage 32. The primary chamber extends to the front opening 15 of the frame 12. The primary chamber is defined by wall 36 and flange 36a. The wall 36 immediately adjacent to the front opening 15 is typically threaded as at 38. The primary chamber is preferably about one and one half (1½) inches long and three-fourths (¾) inches in diameter.

Outlets 40, best shown in FIG. 5, are located on the inclined surface 14 of frame 12. Outlets 40 are positioned one hundred and eighty (180) degrees apart and are typically one-quarter (¼) inch in diameter. Passages 42 lead from outlets 40 to reduced diameter passage 32. The passage 42 is substantially parallel with axis 4 but turns at a right angle creating outlet passage portion 44 which intersects reduced diameter passage 32 at entrance 46. Outlet passage portion 44 is substantially perpendicular to axis 4.

The piston 60 is dimensioned to fit inside primary chamber 34 and partially extend into reduced diameter passage 32. The piston 60 has a stepped outer surface creating two portions 60a, 60b. Piston portion 60a has a diameter of approximately three-fourths (¾) of an inch and a length of approximately seven-eighths (⅞) of an inch. The piston portion 60b has a diameter of approximately one-half (½) inch and a length of approximately one (1) inch. Thus, there is at most a clearance of a few thousandths of an inch between piston portion 60a and wall 36 and between piston portion 60b and reduced diameter passage 32. The travel of piston 60 is limited by cap 16 at one end and by flange surface 36a at the other end. When in a forward position against cap 16, there is no portion of piston 60 between inlet 30 and passage 44. In a closed position, piston portion 60b blocks entrance 46 between inlet 30 and passage 44.

Figure 2:
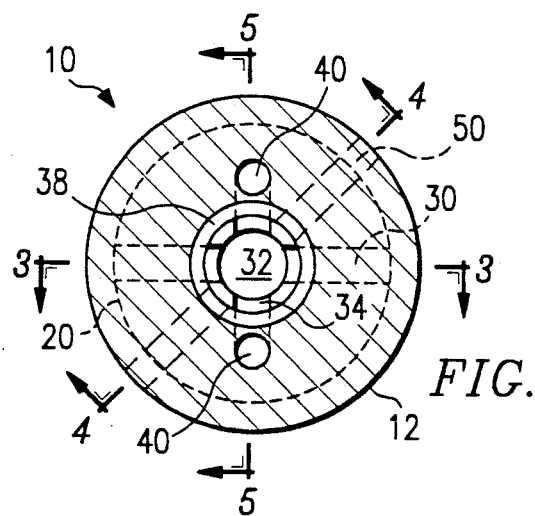
FIG. 2 is a sectional view across line 2—2 in FIG. 1.

FIG. 2 is a sectional view of valve 12 showing the relationships of passages 30, passages 40, and primary chamber 34. Although two inlets and two outlets are preferred, valve 10 would only require at least one of each. Referring simultaneously to FIG. 2 and FIG. 4, vent 50 is shown. Vent 50 and pressure relief passage 54 connects a portion of primary chamber 34 with an area in the feed path of screw 2. Vent 50 is located in the primary chamber 34 immediately adjacent to ridge 36a. Thus, when material is fed into inlet 30 by the rotation of screw 2, material is also fed into ports 52. When the piston 60 is in a forward position, material fills the void created between wall 36 and reduced diameter piston portion 60b. When the piston is forced to a rearward position, this material is forced back through passage 54. Failure to include such a vent 50 could result in a vacuum formation which would inhibit the motion of piston 60.

In operation, material is forced into the reduced diameter passage 32 through inlet 30. This force moves the piston 60 to the forward position. With the piston in this position, material will next travel into passage 42 through entrance 46. The material will then flow out outlets 40 and into an accumulation area (not shown). Next, the screw ram 2 will stop rotating, thereby stopping the feed of material into inlet 30 and inlet 52. The screw ram 2 then translates forward in the barrel 8. This translation forces a set volume of material in the accumulation area into a mold. However, the pressure of the material in the accumulation area transfers through the opening 17 in cap 16 to piston surface 60d, thereby forcing the piston to its back or closed position. In the closed position, piston portion 60b prevents any material from being forced back through passage 42 from re-entering inlet 30. Moreover, the motion of piston 60 shears away any containment or other particles which could foul the seal which is created by piston portion 60b over entrance 46. Pressure loss between opening 46 and inlet 30 is minimized by the length of piston portion 60b extending beyond opening 46.

In sum, a preferred embodiment of the valve 10 fits into the same area as a normal non-return valve. Typically, valve 10 is for a two and one-half (2½) inch diameter extruder screw or injection molding screw. The material proceeds downstream between the screw flights due to the rotation of the screw until it encounters the valve 10. As it reaches the valve 10, the material enters the two inlet holes 30 on either side of the valve 10, and proceeds radially to the reduced diameter passage 34 and to the primary chamber 32 located coaxially within the valve. The material also enters into a groove or passage 54 and proceeds downstream until it encounters the primary chamber 32. The material forces the piston 60 into a forward position with approximately a three-eighths (⅜) inch stroke exposing another set of holes 46 that proceeds outwardly in a radial direction until they encounter a similar size passage 42 that proceeds downstream in a lateral direction. The material follows this downstream hole until it finds a discharge 40 of the valve 10. As the downstream area is filled and the screw 2 stops its rotation, the forward stroke then begins and the piston 60 is moved to a rearward position. In a preferred embodiment, the force that is seen on the three-fourths (¾) inch diameter piston surface 60d is greater than the force seen on the one-half (½) inch diameter piston surface 60a although the pressures are the same. Therefore, the piston 60 will move to the rear closing off the entrance 46. This travel again is approximately three-eights (⅜) inch. As the piston moves rearward and covers the hole 46 there is a positive shut off through the sliding and covering of this radial hole.

Although preferred embodiments of the invention have been described in the foregoing Detailed Description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modifications, and substitutions of parts and elements as fall within the spirit of the scope of the invention.

I claim:

1. A non-return valve for use with a feed screw in a barrel with an axis, said barrel defining an accumulation area downstream of said non-return valve, said valve comprising:

a) a frame with a distal end and a proximal end, said frame defining a primary chamber located in said frame, said primary chamber in fluid communication with said accumulation area;

b) a reduced diameter passage located in said frame upstream from and in contact with said primary chamber;

c) at least one inlet connected to said reduced diameter passage and leading to an outer surface of the proximal end;

d) at least one outlet passage extending from said reduced diameter passage to an outer surface on said distal end of said frame; and e) a piston within said primary chamber, said piston having a first portion, a second portion, an upstream face, and a downstream face, said piston dimensioned to slidably engage said primary chamber and reduced diameter passage, said piston having an open position to allow communication between said at least one inlet and said at least one outlet passage and a closed position to seal said at least one outlet passage from said at least one inlet.

2. The non-return valve of claim 1 wherein said valve further comprises:

f) at least one vent connected to said primary chamber and leading to the outer surface of the proximal end.

3. The non-return valve of claim 1 wherein said primary chamber is coaxial with said axis.

4. The non-return valve of claim 1 wherein said reduced diameter passage is coaxial with said axis.

5. The non-return valve of claim 1 wherein said distal end of said frame is substantially conical.

6. The non-return valve of claim 1 wherein said primary chamber is generally cylindrical.

7. The non-return valve of claim 1 wherein said reduced diameter passage is generally cylindrical.

8. The non-return valve of claim 1 wherein said first piston portion has a diameter greater than said second piston portion.

9. The non-return valve of claim 1 wherein said piston is substantially perpendicular to the at least one outlet passage adjacent to said reduced diameter passage.

10. The non-return valve of claim 1 wherein said at least one outlet passage comprises a portion extending perpendicularly from said reduced diameter passage.

11. The non-return valve of claim 1 wherein said piston is dimensioned so that it will slide to the closed position when identical pressures are applied to the upstream face and the downstream face.

12. The non-return valve of claim 1 wherein said piston travels within said frame, said travel being limited to a flow-through cap attached to the distal end of said frame and by a ridge between the primary chamber and the reduced diameter passage.

13. A non-return valve for use in an injection molding apparatus which includes a feed screw defining a helical channel, said feed screw rotatable about an axis and reciprocable along said axis to discharge material from an upstream position to a downstream position at a discharge end thereof, said non-return valve comprising:

a) a frame with a distal end and a proximal end, said proximal end having means for allowing attaching of said proximal end to said feed screw and having at least one inlet radially disposed from said helical channel of said screw into a first cylindrical bore in said frame, said frame further having a second cylindrical bore downstream from said first bore and concentric therewith, said frame also having at least one outlet radially disposed from said first bore to an outer surface of said frame downstream from said inlet;

b) a piston coaxial with said axis and having a first diameter at an upstream portion thereof, so as to be slidable in said first bore and a second diameter at a downstream portion thereof which is slidable within said second bore, said upstream portion dimensioned to seal said outlet from said first bore when said piston is displaced in an upstream direction; and c) a retaining means secured in said second bore at a downstream end of said second bore to prevent displacement of said piston in a downstream direction past a predetermined point.

14. The non-return valve of claim 13 wherein said first bore is concentric with said axis.

15. The non-return valve of claim 13 wherein said first diameter is less than said second diameter.

16. The non-return valve of claim 13 wherein said retaining means includes an annular male threaded member threaded into a corresponding female threaded portion formed at a downstream end of said second bore.

17. The non-return valve of claim 13 wherein said at least one inlet and said at least one outlet are axially spaced.

18. The non-return valve of claim 13 which includes means for venting extending generally downstream from said second bore to said feed screw channel.

19. The non-return valve of claim 13 wherein said frame is integral with said feed screw.

20. A non-return valve for use in an injection molding apparatus which includes a feed screw defining a helical screw channel, said feed screw rotatable about an axis and reciprocable along said axis to discharge material through the non-return valve at a discharge end of said feed screw, said non-return valve comprising:

a) a cylindrical frame having an inlet radially disposed from the helical screw channel extending into a cylindrical first bore in said frame, said first bore being concentric with said axis, said frame further having a cylindrical second bore immediately downstream from said first bore and concentric therewith, said second bore having a diameter which is larger than the diameter of said fist bore, said valve also having a plurality of outlets radially disposed from sad first bore to an outer surface of said valve downstream from said outlet;

b) a piston having a first diameter at an upstream portion thereof which is slightly less than said diameter of said first bore so as to be slidable therein, and a second diameter at a downstream portion thereof which is slightly less than said diameter of said second bore so as to be slidable therein, said upstream portion being able to seal said outlets from communicating with said first bore when said piston is displaced in an upstream direction, said piston being responsive to increases in pressure of said material at said discharge end of said feed screw whereby said piston is forced in an upstream direction sealing said outlets;

c) an annular male threaded member threaded into a corresponding female threaded portion of said feed screw, said annular male threaded member attached at a downstream end of said second bore; and d) a vent extending from an upstream end of said second bore to said screw channel.

21. A non-return valve comprising:

a) a frame with a distal end and a proximal end, said proximal end having means for allowing attaching of said proximal end to a feed screw, b) a primary chamber located in said frame, c) a reduced diameter located in said frame upstream from and in contact with said primary chamber, d) at least one inlet passage connected to said reduced diameter and leading to an outer surface of the proximal end, e) at least one outlet passage connected to said reduced diameter and leading to an outer surface of the distal end, f) a piston within said primary chamber, said piston having a first portion, a second portion, an upstream face and a downstream face, said piston dimensioned to slideably engage said primary chamber and said reduced diameter passage, said piston having an open position to allow communication between said at least one inlet passage and said at least one outlet passage and a closed position sealing said at least one outlet passage from said at least one inlet passage.

* * * * *

UNITED STATES PATENT AND TRADEMARK OFFICE
CERTIFICATE OF CORRECTION

PATENT NO. : 5,151,282
DATED : September 29, 1992
INVENTOR(S) : Robert F. Dray

It is certified that error appears in the above-indentified patent and that said Letters Patent is hereby corrected as shown below:

Title Page:

In the Abstract, line 6, "(34)" should be --(32)-- and "(32)" should be --(34)--; line 8, "(34)" should be --(32)--; line 9, "(32)" should be --(34)--. and line 10, "(34)" should be --(32)--.

Column 3, line 3, "is also" should be --might also be--.

Column 3, line 3, "connects" should be --could connect--.

Column 4, line 34, after "60b and", insert --the wall of--;
 line 39, "passage 44" should be --entrance 46 such as to obstruct said entrance--;
 line 41, "12" should be --10--;
 line 42, "40" should be --50--;
 line 67, after "2", insert --and valve assembly--; and "translates" should be --translate--.

Column 5, line 24, delete "The" and insert --If so adapted, the--.

Column 8, line 2, "outlet" should be --inlet--; and lines 13-14, delete "at siad discharge end of said feed screw" and insert --downstream of said valve--.

Signed and Sealed this

Twenty-eighth Day of September, 1993

Attest:

BRUCE LEHMAN

Attesting Officer

Commissioner of Patents and Trademarks